(12) United States Patent
Resch

(10) Patent No.: US 10,223,033 B2
(45) Date of Patent: Mar. 5, 2019

(54) COORDINATING ARRIVAL TIMES OF DATA SLICES IN A DISPERSED STORAGE NETWORK

(71) Applicant: International Business Machines Corporation, Armonk, NY (US)

(72) Inventor: Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/844,064

(22) Filed: Dec. 15, 2017

(65) Prior Publication Data

US 2018/0107430 A1    Apr. 19, 2018

Related U.S. Application Data

(63) Continuation-in-part of application No. 14/847,855, filed on Sep. 8, 2015, now Pat. No. 9,916,114.

(60) Provisional application No. 62/072,123, filed on Oct. 29, 2014.

(51) Int. Cl.
    *G06F 12/00* (2006.01)
    *G06F 13/00* (2006.01)
    *G06F 3/06* (2006.01)
    *G06F 11/10* (2006.01)

(52) U.S. Cl.
    CPC .......... *G06F 3/0659* (2013.01); *G06F 3/064* (2013.01); *G06F 3/065* (2013.01); *G06F 3/067* (2013.01); *G06F 3/0619* (2013.01); *G06F 11/1076* (2013.01)

(58) Field of Classification Search
    CPC ...... G06F 3/0659; G06F 3/0619; G06F 3/064; G06F 3/065; G06F 3/067; G06F 11/1076

USPC .......................................................... 711/114
    See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Sheng Jen Tsai
(74) *Attorney, Agent, or Firm* — Garlick & Markison; Timothy W. Markison; Harry S. Tyson, Jr.

(57) ABSTRACT

Methods for use in a dispersed storage network (DSN) to coordinate data slice arrival times. In various examples, a DSN computing device receives a store data request, the store data request including a data object. A set of storage units associated with the store data request is identified, and the data object is dispersed storage error encoded to produce a plurality of sets of encoded data slices. One or more sets of write slice requests that include one or more sets of encoded data slices are also generated for reception by storage units of the set of storage units. For each set of write slice requests, a transmission schedule is determined for each write slice request such that the set of write slice requests arrives at corresponding storage units at substantially the same time frame. Each of the write slice requests is then transmitted in accordance with the transmission schedule.

20 Claims, 6 Drawing Sheets

(56) References Cited

U.S. PATENT DOCUMENTS

| | | | |
|---|---|---|---|
| 5,802,364 A | 9/1998 | Senator et al. | |
| 5,809,285 A | 9/1998 | Hilland | |
| 5,890,156 A | 3/1999 | Rekieta et al. | |
| 5,987,622 A * | 11/1999 | Lo Verso | G06F 11/1076 714/6.1 |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,700,809 B1 * | 3/2004 | Ng | G11C 15/00 365/236 |
| 6,718,361 B1 * | 4/2004 | Basani | H04L 67/1095 707/999.01 |
| 6,760,808 B2 * | 7/2004 | Peters | G06F 11/1076 |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 * | 7/2006 | Watson | G06F 17/30339 |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,924,681 B1 * | 12/2014 | Throop | G06F 3/0631 711/114 |
| 8,972,694 B1 * | 3/2015 | Dolan | G06F 13/28 711/170 |
| 9,244,152 B1 * | 1/2016 | Thiagarajan | G01S 5/10 |
| 9,727,266 B2 * | 8/2017 | Resch | G06F 3/0625 |
| 9,841,925 B2 * | 12/2017 | Khadiwala | G06F 3/0659 |
| 9,916,114 B2 * | 3/2018 | Resch | G06F 3/065 |
| 9,921,907 B2 * | 3/2018 | Volvovski | G06F 11/10 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 * | 5/2003 | Shu | G06F 11/1076 |
| 2003/0106005 A1 * | 6/2003 | Jue | G06F 17/5022 714/741 |
| 2003/0163718 A1 * | 8/2003 | Johnson | G06F 12/1408 713/193 |
| 2004/0024963 A1 | 2/2004 | Talagala et al. | |
| 2004/0122917 A1 * | 6/2004 | Menon | G06F 17/30194 709/219 |
| 2004/0215998 A1 | 10/2004 | Buxton et al. | |
| 2004/0228493 A1 | 11/2004 | Ma | |
| 2005/0100022 A1 * | 5/2005 | Ramprashad | H04L 47/10 370/395.42 |
| 2005/0108298 A1 * | 5/2005 | Iyengar | G06F 17/30215 |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0193084 A1 * | 9/2005 | Todd | G06F 3/0607 709/214 |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 * | 10/2006 | Correll, Jr. | G06F 17/30545 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 * | 7/2007 | Gladwin | G06F 21/6227 705/40 |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0082746 A1 * | 4/2008 | Nakamura | G06F 11/0727 711/113 |
| 2008/0243783 A1 * | 10/2008 | Santi | G06F 17/30241 |
| 2009/0089149 A1 * | 4/2009 | Lerner | G01C 21/32 705/7.34 |
| 2009/0094251 A1 * | 4/2009 | Gladwin | G06F 17/30067 |
| 2009/0094318 A1 * | 4/2009 | Gladwin | H04L 67/1097 709/203 |
| 2010/0023524 A1 * | 1/2010 | Gladwin | G06F 3/0617 707/E17.032 |
| 2011/0072321 A1 * | 3/2011 | Dhuse | G06F 11/1076 714/55 |
| 2011/0113065 A1 * | 5/2011 | Cupka | G06F 17/30168 707/783 |
| 2011/0161679 A1 * | 6/2011 | Grube | G06F 11/1076 713/193 |
| 2012/0054456 A1 * | 3/2012 | Grube | G06F 3/0619 711/158 |
| 2012/0117351 A1 * | 5/2012 | Motwani | G06F 3/0614 711/165 |
| 2012/0131584 A1 * | 5/2012 | Raevsky | G06F 8/45 718/102 |
| 2012/0167108 A1 * | 6/2012 | Bowers | G06F 9/5072 718/103 |
| 2013/0275656 A1 * | 10/2013 | Talagala | G06F 12/0246 711/103 |
| 2013/0326264 A1 * | 12/2013 | Resch | G06F 11/1088 714/6.2 |
| 2014/0177476 A1 * | 6/2014 | Perrett | H04L 41/12 370/255 |
| 2015/0067421 A1 * | 3/2015 | Baptist | H04L 67/1097 714/723 |
| 2015/0378616 A1 * | 12/2015 | Khadiwala | G06F 3/0659 711/114 |
| 2015/0378626 A1 * | 12/2015 | Motwani | G06F 3/067 711/114 |
| 2015/0378822 A1 * | 12/2015 | Grube | G06F 11/1092 714/763 |
| 2015/0381730 A1 * | 12/2015 | Resch | G06F 3/0616 709/225 |
| 2015/0381731 A1 * | 12/2015 | Grube | H04L 67/1097 709/224 |
| 2016/0139841 A1 * | 5/2016 | Agetsuma | G06F 3/06 711/162 |
| 2016/0179618 A1 * | 6/2016 | Resch | H04L 63/101 714/764 |
| 2016/0188253 A1 * | 6/2016 | Resch | G06F 3/0647 711/172 |
| 2016/0226522 A1 * | 8/2016 | Resch | H04L 67/1097 |
| 2016/0255150 A1 * | 9/2016 | Dhuse | H04L 67/1097 709/213 |
| 2016/0292254 A1 * | 10/2016 | Dhuse | G06F 17/30336 |
| 2016/0294949 A1 * | 10/2016 | Motwani | H04L 67/1097 |
| 2016/0306699 A1 * | 10/2016 | Resch | H04L 67/1097 |
| 2016/0342475 A1 * | 11/2016 | Dhuse | G06F 11/076 |
| 2016/0378350 A1 * | 12/2016 | Motwani | G06F 3/0607 711/154 |

(56) References Cited

U.S. PATENT DOCUMENTS

| | | | |
|---|---|---|---|
| 2017/0147428 A1* | 5/2017 | Volvovski | G06F 11/10 |
| 2017/0168720 A1* | 6/2017 | Kazi | G06F 3/0604 |
| 2017/0168749 A1* | 6/2017 | Grube | G06F 3/0644 |
| 2017/0177228 A1* | 6/2017 | Baptist | G06F 3/0604 |
| 2018/0081586 A1* | 3/2018 | Kazi | G06F 3/0647 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): Directory Information Models; IETF Network Working Group; RFC 4512; Jun. 2006; pp. 1-49.

\* cited by examiner

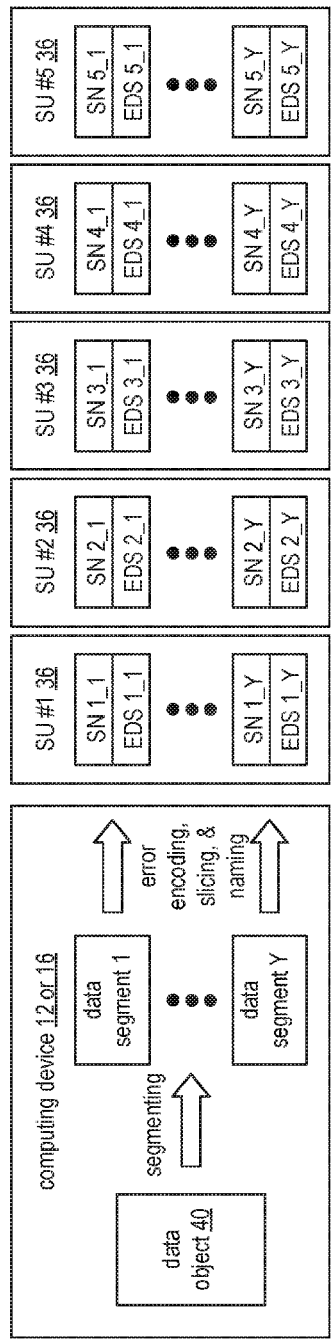
FIG. 3
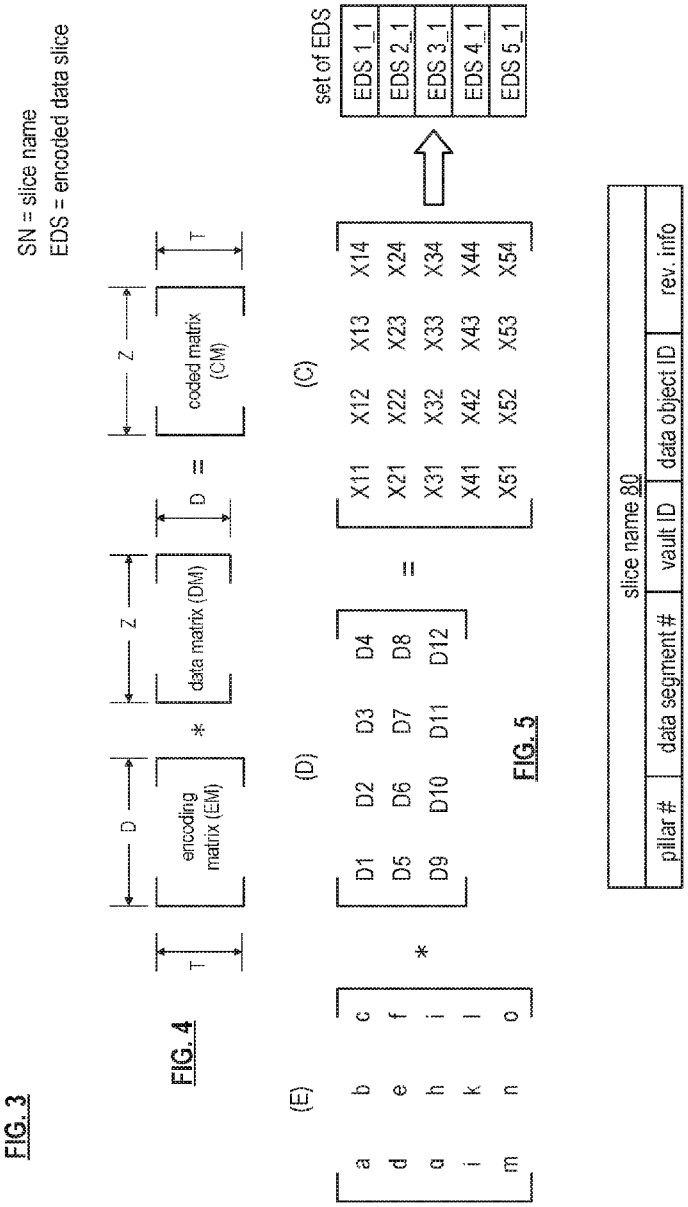
FIG. 4
FIG. 5
FIG. 6

COORDINATING ARRIVAL TIMES OF DATA SLICES IN A DISPERSED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 14/847,855, entitled "DETERMINISTICALLY SHARING A PLURALITY OF PROCESSING RESOURCES," filed Sep. 8, 2015, which claims priority pursuant to 35 U.S.C. § 119(e) to U.S. Provisional Application No. 62/072,123, entitled "ASSIGNING TASK EXECUTION RESOURCES IN A DISPERSED STORAGE NETWORK," filed Oct. 29, 2014, both of which are hereby incorporated herein by reference in their entirety and made part of the present U.S. Utility Patent Application for all purposes.

BACKGROUND

This invention relates generally to computer networks, and more specifically, to coordination of data storage operations in a dispersed storage network.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

SUMMARY

According to embodiments of the present disclosure, novel methods are presented for use in a dispersed storage network (DSN) to coordinate arrival times of related data write requests at storage units of a set of storage units. In various examples, a store data request including a data object is received. A set of storage units associated with the store data request is identified, and the data object is dispersed storage error encoded to produce a plurality of sets of encoded data slices. One or more sets of write slice requests, including one or more sets of encoded data slices, are then generated for reception by storage units of the set of storage units. For each set of write slice requests, a transmission schedule is determined for each write slice request such that the set of write slice requests arrives at corresponding storage units at substantially the same time frame. Each of the write slice requests is then transmitted in accordance with the transmission schedule.

BRIEF DESCRIPTION OF THE DRAWINGS

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION

Figure 1:
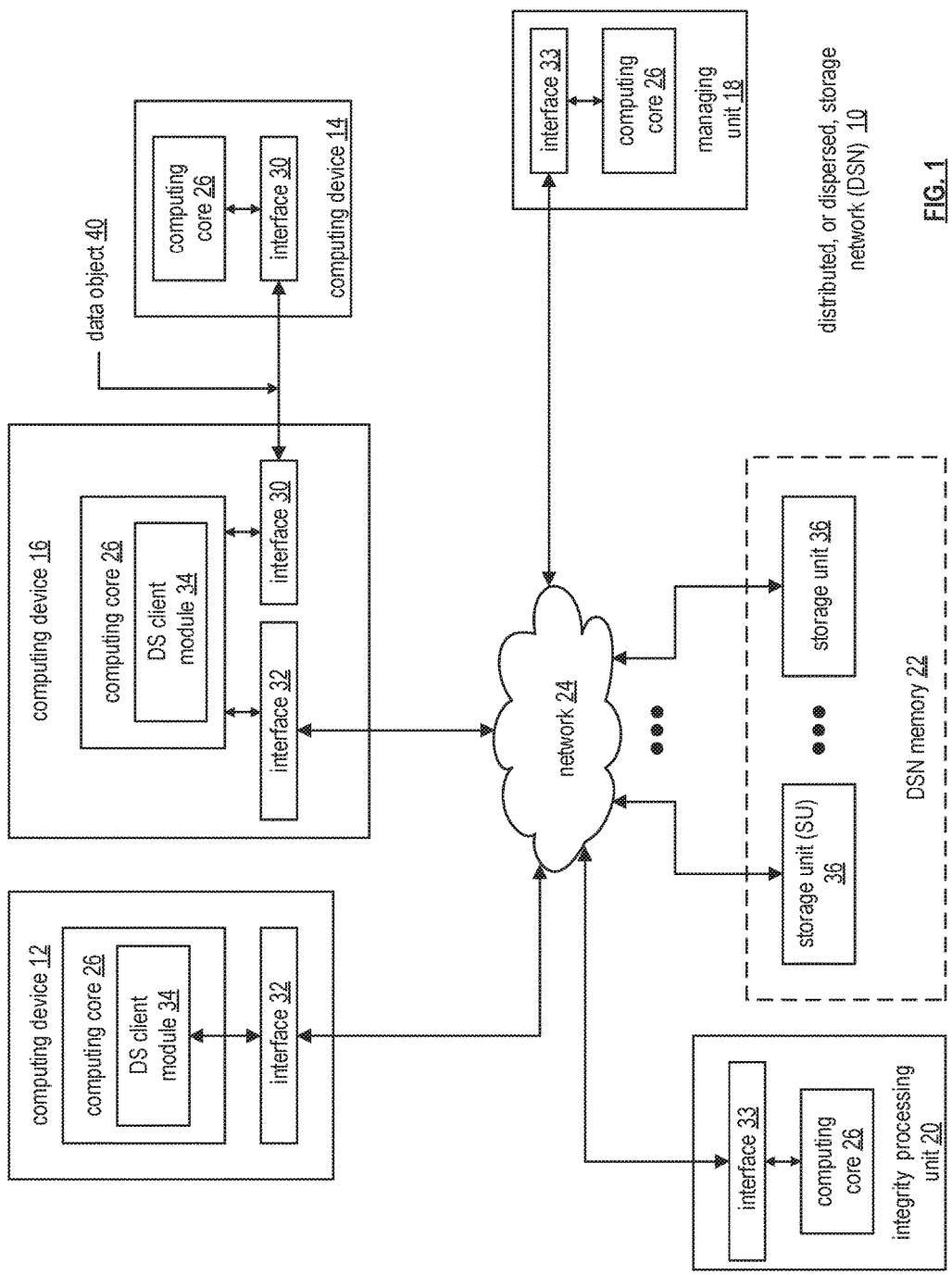
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
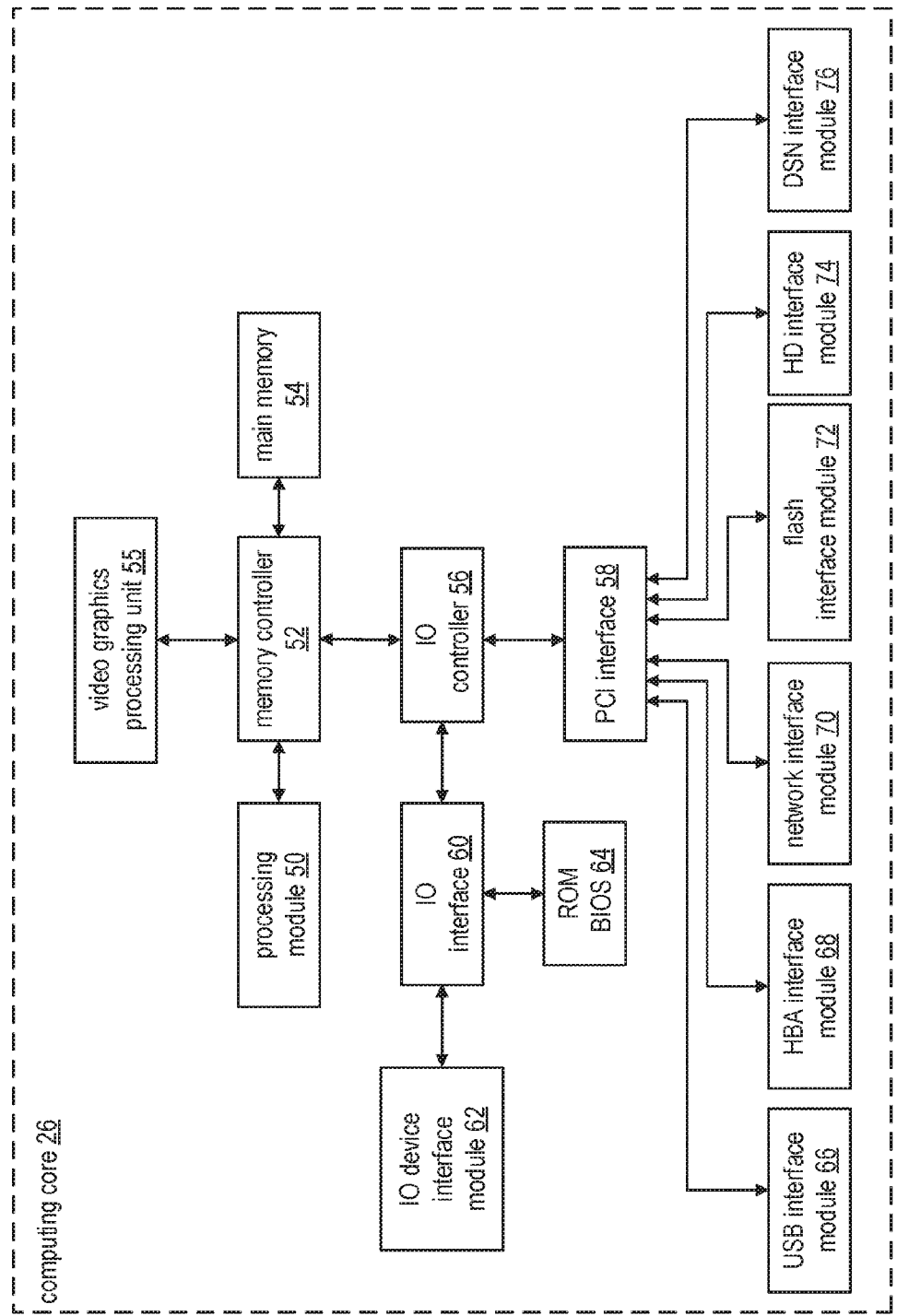
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more than or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of coordinating data access operations to avoid conflict situations are discussed in greater detail below with reference to FIGS. 9-10.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
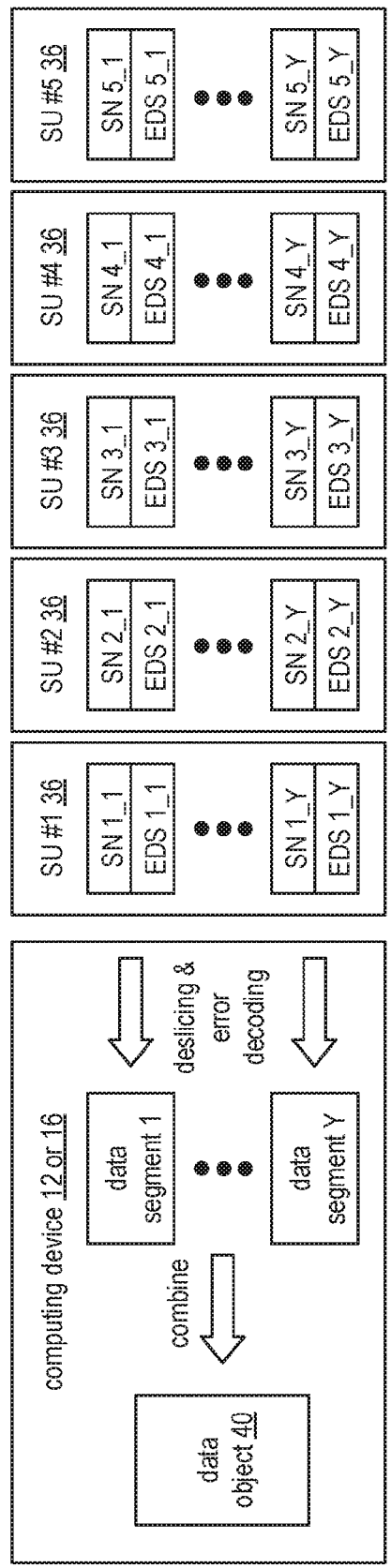
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
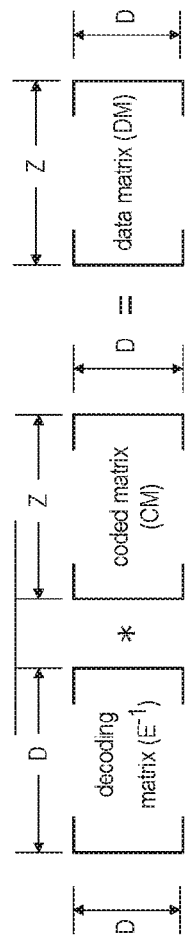
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

When a DS client module of a computing device of a DSN issues a set of write slice requests to store encoded data slices in set of storage units, respective write slice requests may arrive at relatively proximate storage units before arriving at relatively distant storage units. In certain situations, this may give rise conflict scenarios. For example, a DSN device may consistently win access to a nearby storage unit as compared to a distant DSN device, while losing access to distant storage units being simultaneously accessed by the distant DSN device. As a result, it is possible that neither DSN device may be able to gain access/acquire locks on at least a write threshold number of storage units when the storage units are in different locations. In the novel methodologies described below, rather than issue a set write slice requests simultaneously, a DS client module generates a transmission schedule in which transmission of requests to relatively proximate storage units are delayed as compared to requests to distant storage units, thereby reducing the potential of conflict situations.

Figure 9:
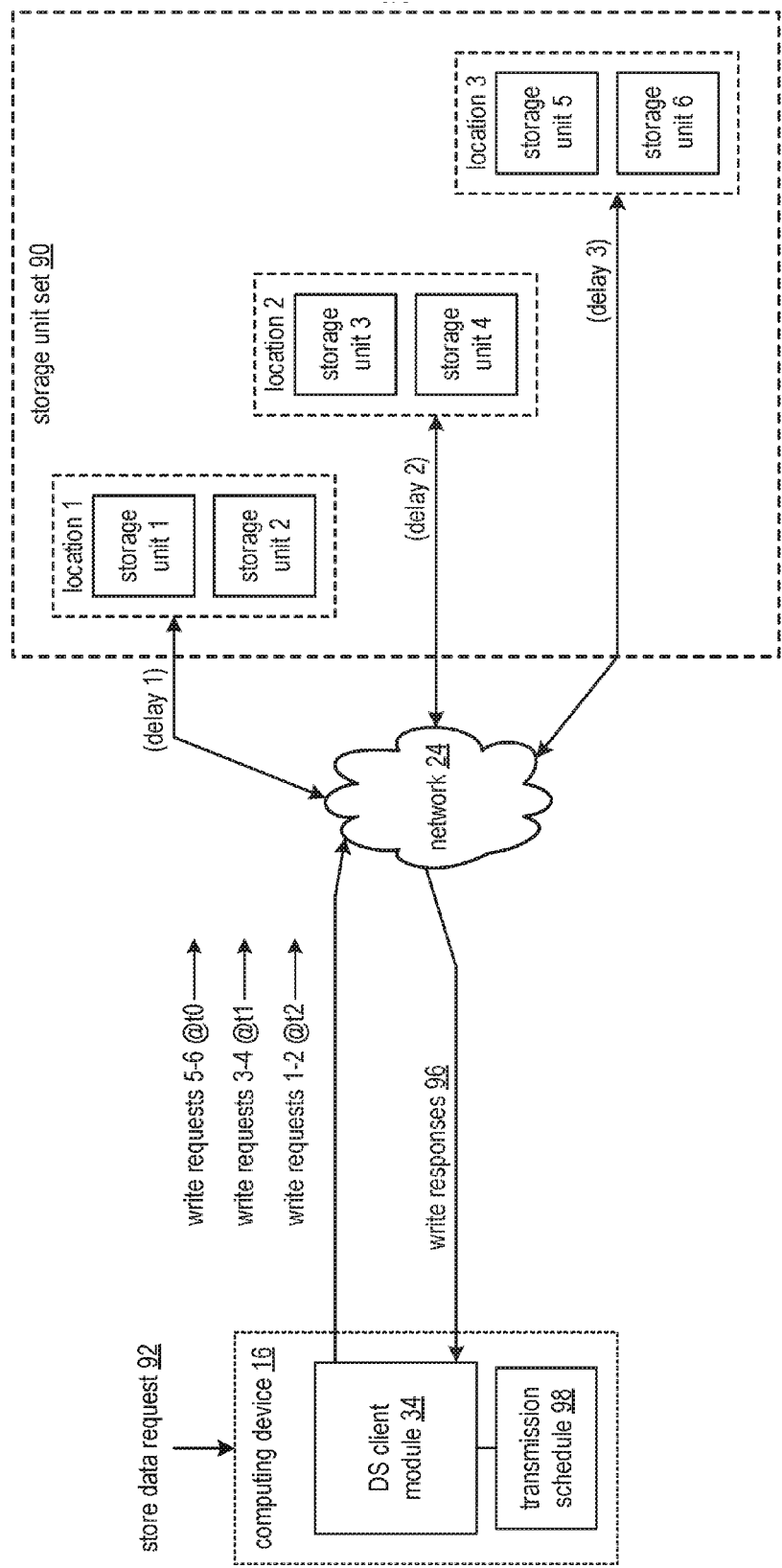
FIG. 9 illustrates a schematic block diagram of an example of a DSN storing data in accordance with an embodiment of the present disclosure.

FIG. 9 illustrates a schematic block diagram of an example of a dispersed storage network (DSN) storing data in accordance with an embodiment of the present disclosure. The illustrated DSN includes the computing device 16 of FIG. 1, the network 24 of FIG. 1, and a storage unit set 90. The computing device 16 includes the DS client module 34 of FIG. 1. Each storage unit 1-6 may be implemented utilizing the storage unit 36 of FIG. 1, and include a DS client module 34 and a processing module (not separately illustrated). The storage unit set 90 includes a plurality of locations 1-3, where each location includes at least one storage unit. For example, the location 1 includes storage units 1-2, the location 2 includes storage units 3-4, and the location 3 includes storage units 5-6.

In general, the set of storage units 1-6 stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

In the illustrated example, the plurality of locations are established at different distances from the computing device 16 such that messages sent by the computing device 16, via the network 24, arrive at different times at the different locations. For instance, messages sent from the computing device 16 via the network 24 to the storage units at the location 1 incur a delay 1 of 20 ms (e.g., half of a round trip transmission time), messages sent from the computing device 16 via the network 24 to the storage units at the location 2 incur a delay 2 of 30 ms, and messages sent from the computing device 16 via the network 24 to the storage units at the location 3 incur a delay 3 of 40 ms.

The DSN is operable to store data as sets of encoded data slices in the storage unit set. In an example of operation of the storing of the data, the computing device 16 receives a store data request 92, where the store data request 92 includes one or more of a data object, a data object name, and a requester identifier (ID). Having received the store data request 92, the DS client module 34 identifies the storage unit set that is associated with the store data request 92. Identifying the storage unit set includes at least one of performing a vault lookup based on the requester ID, performing a random selection, and selecting based on available storage capacity.

Having identified the storage unit set, the DS client module 34 dispersed storage error encodes the data object to produce a plurality of sets of encoded data slices. Having generated the encoded data slices, the DS client module 34 generates one or more sets of write slice requests that includes the one or more sets of encoded data slices of the plurality of sets of encoded data slices.

For each set of write slice requests, the DS client module 34 determines a transmission schedule 98 such that the set of write slice requests arrives at the plurality of locations at substantially the same time frame. For example, the DS client module 34 obtains estimated transmission times (e.g., via a lookup operation, initiating a test, interpreting test results, etc.) to each storage unit, identifies a longest transmission time, and establishes a time delay for each storage unit as a difference between the longest transmission time and the estimated transmission time associated with the storage unit, where the delay time is an amount of time to wait before sending the write slice request to the storage unit after sending a first write slice request to a storage unit associated with the longest transmission time. In an example, time delays are calculated as half of a relevant round-trip transmission time, such that the expectation is that all write slice requests of a set of write slice requests arrive at respective destination storage units at approximately the same time.

Having determined the transmission schedule 98 for each read slice request, a DS client module 34 sends, via the network 24, each write slice request in accordance with the transmission schedule 98. For example, the DS client module 34 sends, at a beginning time zero, write slice requests 5-6 to storage units 5-6 at location 3. Next, at a time 1 (e.g., first time delay), write slice requests 3-4 are sent to the storage units 3-4 at location 2. The DS client module 34 then sends, at a time 2 (e.g., second time delay), write slice requests 1-2 to the storage units 1-2 at location 1.

Having sent the write slice requests, the DS client module 34 receives write slice responses as write responses 96 from at least some of the storage units 1-6. The DS client module 34 processes the store data request based on the received write slice responses. For example, the DS client module 34 indicates successful storage when receiving a write threshold number of favorable write slice responses within a time frame. As another example, the DS client module 34 resends one or more write slice requests when not receiving the write threshold number of favorable write slice responses within the time frame (e.g., another DS client module 34 has temporarily locked slice names of the writing process in a write conflict scenario).

Figure 10:
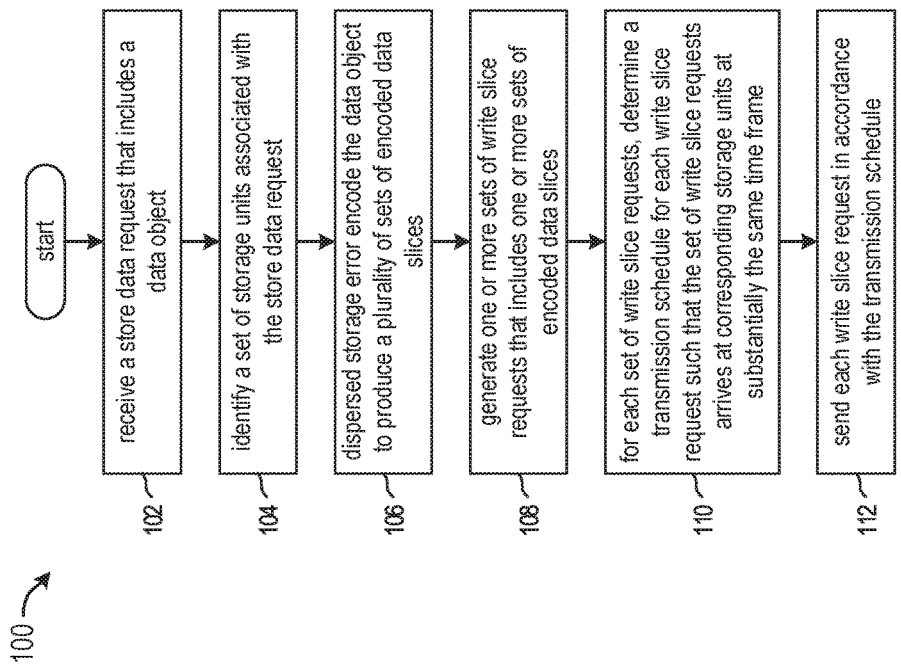
FIG. 10 is a flowchart illustrating an example of storing data in accordance with an embodiment of the present disclosure.

FIG. 10 is a flowchart 100 illustrating an example of storing data in accordance with an embodiment of the present disclosure. The method begins or continues at step 102 where a processing module (e.g., of a distributed storage (DS) client module 34) receives a store data request that includes a data object. Receiving the store data request may further include receiving a requester identity and a data object name. The method continues at step 104 where the processing module identifies a set of storage units associated with the store data request. Identifying the set of storage units can include at least one of interpreting a vault lookup based on a requester identifier, performing a random selection, performing a selection based on available storage capacity, performing a selection based on performance, and performing a selection based on transmission time delays to each storage unit of the set of storage units.

The method continues at step 106 where the processing module dispersed storage error encodes the data object to produce a plurality of sets of encoded data slices. The processing module may further generate a plurality of sets of slice names corresponding to the plurality of sets of encoded data slices. The method continues at step 108 where the processing module generates one or more sets of write slice requests that include one or more sets of encoded data slices. For example, the processing module generates a write slice request for each storage unit of the set of storage units, where each read slice request includes encoded data slices associated with the storage unit and slice names associated with the encoded data slices.

For each set of write slice requests, the method continues at step 110 where the processing module determines a transmission schedule for each write slice request such that the set of write slice requests arrives at corresponding storage units at substantially the same time frame. For example, for each storage unit, the processing module obtains an estimated transmission time (e.g., a lookup, initiating a test, interpreting test results), identifies a longest transmission time, and establishes a time delay for each storage unit as a difference between the longest transmission time and the estimated transmission time of the storage unit.

The method continues at step 112 where the processing module sends each write slice request in accordance with the transmission schedule. For example, the processing module sends a write slice request associated with a storage unit of the longest transmission time first, and initiates timing such that the processing module sends successive write slice requests based on the time delays of the transmission schedule. Alternatively, or in addition to, upon detecting a storage failure (e.g., when a time frame elapses without receiving a read threshold number of favorable write slice responses), the processing module recalculates the transmission schedule to vary the delay times and resends write slice requests in accordance with the varied delay times.

The methods described above in conjunction with the computing device 16 and storage units 36 can alternatively be performed by other modules (e.g., DS client modules 34) of a dispersed storage network or by other devices (e.g., managing unit 18). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions/program instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provide an industry-accepted tolerance for its corresponding term and/or relativity between items. Such an industry-accepted tolerance ranges from less than one percent to fifty percent. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagrams, can be implemented by special purpose hardware-based systems that perform the specified functions or acts or carry out combinations of special purpose hardware and computer instructions.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be one or more tangible devices that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
   receiving a store data request, the store data request including a data object;
   identifying a set of storage units associated with the store data request, wherein at least two of the storage units are co-located storage units;
   dispersed storage error encoding the data object to produce a plurality of sets of encoded data slices, wherein the data object is segmented into a plurality of data segments and wherein each data segment is dispersed storage error encoded into a respective set of encoded data slices;
   generating, for reception by storage units of the set of storage units, one or more sets of write slice requests that include, respectively, one or more sets of encoded data slices;
   determining, for a set of write slice requests, a transmission schedule for each write slice request such that each write slice request of the set of write slice requests arrives at a corresponding storage unit of the set of storage units at approximately the same time, wherein the transmission schedules are based on estimated transmission times for receiving write slice requests by corresponding storage units of the set of storage units;
   sending each write slice request of the set of write slice requests in accordance with a respective transmission schedule, including sending write slices requests to the co-located storage units using a common time delay value;
   receiving write slice responses from at least some of the storage units of the set of storage units; and
   in response to receiving less than a write threshold number of favorable write slice responses within a time frame:
      recalculating one or more of the transmission schedules to vary one or more time delay value associated with one or more of the write slice requests; and
      resending, to the set of storage units, the one or more of the write slice requests in accordance with the recalculated one or more of the transmission schedules.

2. The method of claim 1, wherein at least some of the storage units of the set of storage units are in differing locations, and wherein determining a transmission schedule for each write slice request comprises:
   obtaining, for each storage unit of the set of storage units, a respective estimated transmission time for receiving a write slice request;
   identifying a longest transmission time of the respective estimated transmission times; and
   establishing, for each storage unit of the set of storage units, a time delay value as a difference between the longest transmission time and the respective estimated transmission time for a storage unit, wherein a time delay value indicates an amount of time to delay sending a corresponding write slice request after sending a write slice request to a storage unit associated with the longest transmission time.

3. The method of claim 2, wherein obtaining a respective estimated transmission time includes at least one of a lookup operation, initiating a test, or interpreting test results.

4. The method of claim 1 further comprises:
indicating successful storage of the one or more sets of encoded data slices when receiving the write threshold number of favorable write slice responses within a second time frame.

5. The method of claim 1, wherein resending the one or more of the write slice requests includes resending each write slice request of the set of write slice requests.

6. The method of claim 1, wherein identifying the set of storage units includes at least one of interpreting a vault lookup based on a requester identifier, performing a random selection, performing a selection based on available storage capacity, performing a selection based on performance, or performing a selection based on transmission time delays to each storage unit of the set of storage units.

7. The method of claim 1, wherein generating the one or more sets of write slice requests further includes:
generating a plurality of slice names corresponding to the one or more sets of encoded data slices, wherein each write slice request of the one or more sets of write slice requests further includes a slice name corresponding to a respective encoded data slice of the write slice request.

8. The method of claim 1, wherein the store data request further includes a requester identifier and a data object name.

9. A computer readable storage medium comprises:
at least one memory section that stores operational instructions that, when executed by one or more processing modules of a dispersed storage network (DSN), causes the one or more processing modules to:
receive a store data request, the store data request including a data object;
identify a set of storage units associated with the store data request, wherein at least two of the storage units of the set of storage units are co-located storage units;
dispersed storage error encode the data object to produce a plurality of sets of encoded data slices, wherein the data object is segmented into a plurality of data segments and wherein each data segment is dispersed storage error encoded into a respective set of encoded data slices;
generate, for reception by storage units of the set of storage units, one or more sets of write slice requests that include, respectively, one or more sets of encoded data slices;
determine, for a set of write slice requests, a transmission schedule for each write slice request such that each write slice request of the set of write slice requests arrives at a corresponding storage unit of the set of storage units at approximately the same time frame, wherein the transmission schedules are based on estimated transmission times for receiving write slice requests by corresponding storage units of the set of storage units;
send each write slice request of the set of write slice requests in accordance with a respective transmission schedule, including sending write slices requests to the co-located storage units using a common time delay value;
receive write slice responses from at least some of the storage units of the set of storage units; and
in response to receiving less than a write threshold number of favorable write slice responses within a time frame:
recalculate one or more of the transmission schedules to vary one or more time delay value associated with one or more of the write slice requests; and
resend, to the set of storage units, the one or more of the write slice requests in accordance with the recalculated one or more of the transmission schedules.

10. The computer readable storage medium of claim 9, wherein the at least one memory section stores further operational instructions that, when executed by the one or more processing modules to determine a transmission schedule for each write slice request, causes the one or more processing modules to:
obtain, for each storage unit of the set of storage units, a respective estimated transmission time for receiving a write slice request;
identify a longest transmission time of the respective estimated transmission times; and
establish, for each storage unit of the set of storage units, a time delay value as a difference between the longest transmission time and the respective estimated transmission time for a storage unit, wherein a time delay value indicates an amount of time to delay sending a corresponding write slice request after sending a write slice request to a storage unit associated with the longest transmission time.

11. The computer readable storage medium of claim 10, wherein obtaining a respective estimated transmission time includes at least one of a lookup operation, initiating a test, or interpreting test results.

12. The computer readable storage medium of claim 9, wherein the at least one memory section stores further operational instructions that, when executed by the one or more processing modules, causes the one or more processing modules to:
indicate successful storage of the one or more sets of encoded data slices when receiving the write threshold number of favorable write slice responses within a second time frame.

13. The computer readable storage medium of claim 9, wherein the at least one memory section stores further operational instructions that, when executed by the one or more processing modules to resend the one or more of the write slice requests, causes the one or more processing modules to resend each write slice request of the set of write slice requests.

14. The computer readable storage medium of claim 9, wherein identifying the set of storage units includes performing a selection based on transmission time delays to each storage unit of the set of storage units.

15. A computing device of a dispersed storage network (DSN), the computing device comprises:
a network interface;
a memory comprising instructions; and
one or more processing modules in communication with the memory, wherein the one or more processing modules execute the instructions to:
receive, via the network interface, a store data request, the store data request including a data object;

identify a set of storage units associated with the store data request, wherein at least two of the storage units of the set of storage units are co-located storage units;

dispersed storage error encode the data object to produce a plurality of sets of encoded data slices, wherein the data object is segmented into a plurality of data segments and wherein each data segment is dispersed storage error encoded into a respective set of encoded data slices;

generate, for reception by storage units of the set of storage units, one or more sets of write slice requests that include, respectively, one or more sets of encoded data slices;

determine, for a set of write slice requests, a transmission schedule for each write slice request such that each write slice request of the set of write slice requests arrives at a corresponding storage unit of the set of storage units at approximately the same time, wherein the transmission schedules are based on estimated transmission times for receiving write slice requests by corresponding storage units of the set of storage units;

send, via the network interface, each write slice request of the set of write slice requests in accordance with a respective transmission schedule, including sending write slices requests to the co-located storage units using a common time delay value;

receive, via the network interface, write slice responses from at least some of the storage units of the set of storage units; and in response to receiving less than a write threshold number of favorable write slice responses within a time frame:
  recalculate one or more of the transmission schedules to vary one or more time delay value associated with one or more of the write slice requests; and
  resend, to the set of storage units via the network interface, the one or more of the write slice requests in accordance with the recalculated one or more of the transmission schedules.

16. The computing device of claim 15, wherein the one or more processing modules further execute the instructions to:
  obtain, for each storage unit of the set of storage units, a respective estimated transmission time for receiving a write slice request;
  identify a longest transmission time of the respective estimated transmission times; and
  when determining the transmission schedule for each write slice request, establish, for each storage unit of the set of storage units, a time delay value as a difference between the longest transmission time and the respective estimated transmission time for a storage unit, wherein a time delay value indicates an amount of time to delay sending a corresponding write slice request after sending a write slice request to a storage unit associated with the longest transmission time.

17. The computing device of claim 16, wherein obtaining a respective estimated transmission time includes at least one of a lookup operation, initiating a test, or interpreting test results.

18. The computing device of claim 15, wherein the one or more processing modules further execute the instructions to:
  indicate successful storage of the one or more sets of encoded data slices when receiving the write threshold number of favorable write slice responses within a second time frame.

19. The computing device of claim 15, wherein resending the one or more of the write slice requests includes resending each write slice request of the set of write slice requests.

20. The computing device of claim 15, wherein identifying the set of storage units includes performing a selection based on transmission time delays to each storage unit of the set of storage units.

* * * * *